(12) United States Patent
Kozuru et al.

(10) Patent No.: US 9,847,163 B2
(45) Date of Patent: Dec. 19, 2017

(54) CURRENT TRANSFORMER SUPPORT DEVICE AND SWITCHGEAR USING CURRENT TRANSFORMER SUPPORT DEVICE

(71) Applicant: Mitsubishi Electric Corporation, Chiyoda-ku, Tokyo (JP)

(72) Inventors: Susumu Kozuru, Tokyo (JP); Shinichi Numata, Tokyo (JP); Yuichi Yamaji, Tokyo (JP); Takahiro Sasaki, Tokyo (JP)

(73) Assignee: MITSUBISHI ELCTRIC CORPORATION, Chiyods-Ku, Tokyo (JP)

( * ) Notice: Subject to any disclaimer, the term of this patent is extended or adjusted under 35 U.S.C. 154(b) by 2 days.

(21) Appl. No.: 14/916,385

(22) PCT Filed: Feb. 20, 2014

(86) PCT No.: PCT/JP2014/054021
§ 371 (c)(1),
(2) Date: Mar. 3, 2016

(87) PCT Pub. No.: WO2015/064118
PCT Pub. Date: May 7, 2015

(65) Prior Publication Data
US 2016/0217898 A1    Jul. 28, 2016

(30) Foreign Application Priority Data
Oct. 30, 2013 (JP) .................................. 2013-224854

(51) Int. Cl.
*H01F 27/04* (2006.01)
*H01F 38/20* (2006.01)
(Continued)

(52) U.S. Cl.
CPC ............. *H01F 27/04* (2013.01); *H01F 38/20* (2013.01); *H02B 11/04* (2013.01); *H02B 11/173* (2013.01);
(Continued)

(58) Field of Classification Search
CPC ............................................ H02B 1/00–15/04
See application file for complete search history.

(56) References Cited

U.S. PATENT DOCUMENTS

| 3,793,562 A | 2/1974 | Cleaveland |
| 6,754,059 B2 * | 6/2004 | Bach ...................... H02B 11/26 361/111 |

(Continued)

FOREIGN PATENT DOCUMENTS

| DE | 20 2008 009 101 U1 | 9/2008 |
| JP | 4-295206 A | 10/1992 |

(Continued)

OTHER PUBLICATIONS

International Search Report (PCT/ISA/210) dated Mar. 18, 2014, by the Japanese Patent Office as the International Searching Authority for International Application No. PCT/JP2014/054021.

(Continued)

*Primary Examiner* — Robert J Hoffberg
(74) *Attorney, Agent, or Firm* — Buchanan Ingersoll & Rooney PC

(57) ABSTRACT

A current transformer support device includes three plate-like conductors, each of which has a first connection portion at one end and a second connection portion at the other end, and which are aligned linearly side by side while being spaced apart from one another, and a current transformer case which integrally insulates and supports the three conductors between the one end and the other end. The current transformer support device is characterized in that the cur- (Continued)

rent transformer case has current transformer attachment portions provided at positions corresponding to at least two of the three conductors, to which ring-like current transformer coils formed so as to insert the conductors are attached, and that the current transformer case and the current transformer coils attached to the current transformer attachment portions are formed into one unit with a hardening insulating material.

8 Claims, 14 Drawing Sheets

(51) Int. Cl.
  *H02B 11/173* (2006.01)
  *H02B 11/04* (2006.01)
  *H02B 13/035* (2006.01)
  *H02B 13/02* (2006.01)

(52) U.S. Cl.
  CPC ......... *H02B 13/02* (2013.01); *H02B 13/0356* (2013.01)

(56) References Cited

U.S. PATENT DOCUMENTS

| | | | | |
|---|---|---|---|---|
| 7,286,337 | B2* | 10/2007 | Masuhara | H02B 11/167 361/603 |
| 7,652,871 | B2* | 1/2010 | Caggiano | H02B 1/04 324/117 R |
| 8,045,322 | B2* | 10/2011 | Kurogi | H02B 13/01 361/606 |
| 9,117,588 | B2* | 8/2015 | Gross | H01F 27/30 |
| 9,270,093 | B2* | 2/2016 | Kutalek | H01B 17/583 |
| 2003/0001702 | A1 | 1/2003 | Bach et al. | |
| 2012/0001645 | A1* | 1/2012 | Javora | G01R 15/142 324/658 |
| 2013/0207638 | A1 | 8/2013 | Gross et al. | |
| 2015/0244156 | A1* | 8/2015 | Kutalek | H02B 11/04 361/611 |

FOREIGN PATENT DOCUMENTS

| | | | |
|---|---|---|---|
| JP | H09-283357 A | | 10/1997 |
| JP | 2000-021662 A | | 1/2000 |
| JP | 2000114082 A | * | 4/2000 |
| JP | 2000-331856 A | | 11/2000 |
| JP | 2005-137147 A | | 5/2005 |
| JP | 2007-37358 A | | 2/2007 |

OTHER PUBLICATIONS

The extended European Search Report dated Feb. 6, 2017, by the European Patent Office in corresponding European Patent Application No. 14857557.4. (7 pages).

Office Action (Notice on the First Office Action) dated Feb. 4, 2017, by the State Intellectual Property Office of China in corresponding Chinese Patent Application No. 201480059370.0 and English translation of the Office Action. (20 pages).

Office Action (Notice of Preliminary Rejection) dated Mar. 10, 2017, by the Korean Patent Office in corresponding Korean Patent Application No. 10-2016-7010820 and English translation of the Office Action. (10 pages).

* cited by examiner

FIG.1A
FIG.1B
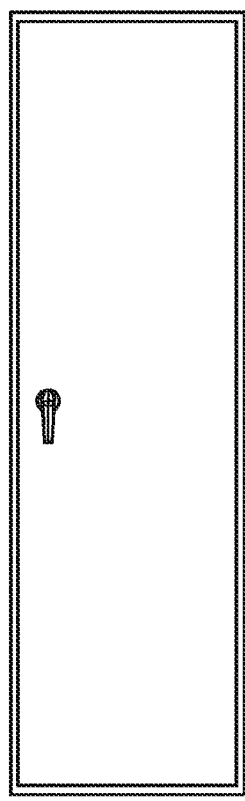
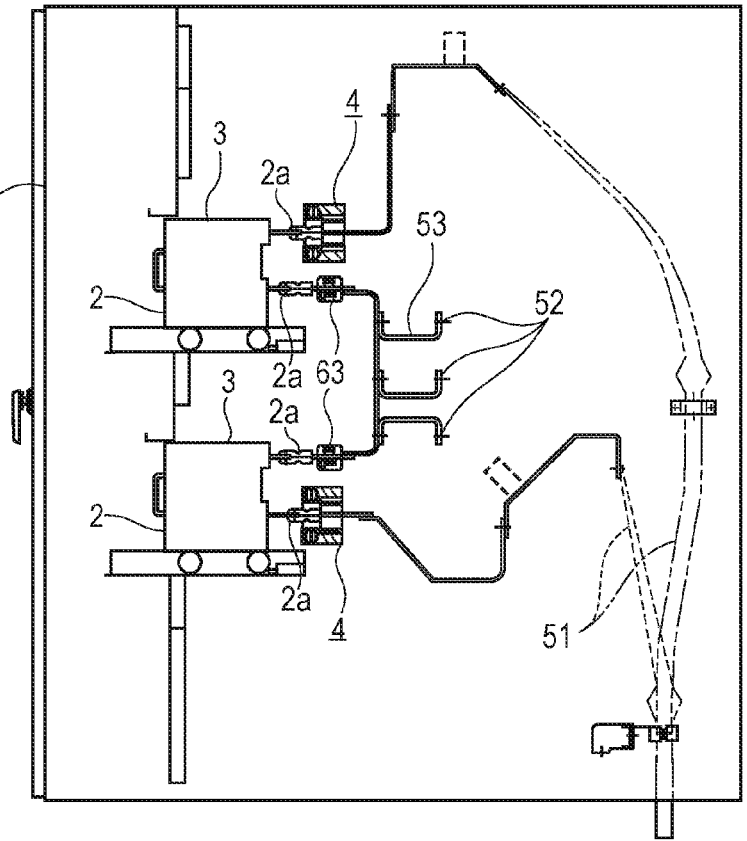

45

CURRENT TRANSFORMER SUPPORT DEVICE AND SWITCHGEAR USING CURRENT TRANSFORMER SUPPORT DEVICE

TECHNICAL FIELD

The present invention relates to a current transformer support device disposed in a portion opposing a back surface of electrical equipment, such as a withdrawable circuit breaker, and having a pair of contact terminals for three phases which makes and breaks contact with a pair of three-phase terminals provided to the back surface in association with a movement of the electrical equipment in a pull-out or push-in direction, and to a switchgear using the current transformer support device.

BACKGROUND ART

A current transformer (hereinafter, occasionally abbreviated to CT) which measures a current flowing through a circuit of a switchgear is crucial equipment. However, one of problems arising when a size reduction of the switchgear is required is to save a space where the CT is stored. A technique in the related art provides a switchgear in which electrical equipment is stored in a drawable manner. The switchgear has a pair of contact terminals for three phases in a portion opposing aback surface of the electrical equipment. A pair of the contact terminals makes and breaks contact with a pair of three-phase terminals provided to the back surface of the electrical equipment in association with a movement of the electrical equipment in a pull-out or push-in direction. Three conductors forming the contact terminals for three phases are integrally molded with an insulator. The CTs are attached to at least two of the three conductors. Also, the three conductors are bundled while being spaced apart by a predetermined insulating distance secured by the insulator, and a zero-phase current transformer (hereinafter, occasionally abbreviated to ZCT) is attached on the outside of the bundled portion of the three conductors. The CTs and the ZCT are integrally molded in the insulator (see, for example, PTL 1).

CITATION LIST

Patent Literature

PTL 1: JP-A-2005-137147 (page 1, FIG. 1, and FIG. 2)

SUMMARY OF INVENTION

Technical Problem

Switchgears include various types which are largely divided to a type with high protection degree (MW type and PW type) in which respective pieces of equipment are disposed in compartments physically divided by a shielding member and a type with low protection degree (CW type) in which no shielding member is used. The switchgear uses a bushing which not only insulates and supports a circuit (conductors) that fits to terminals of drawable electrical equipment, such as a breaker, but also withstands a load induced by an electromagnetic repulsion force applied to the circuit (conductors). The bushing is known to have an effect of shielding drawable electrical equipment, such as a breaker, from other compartments, for example, a main bus chamber and a cable chamber, and is installed in the switchgear when a necessity arises according to required protection degree.

In the case of the technique in the related art of PTL 1, however, when a breaker is shared by different switchgears, a bushing furnished with a shielding function is also used in a type with low protection degree (CW type) for which it is not necessary to shield a breaker chamber from the other compartments. Hence, this technique has a problem that the cost is increased. Further, the bushing is manufactured by integrally molding the CTs and the ZCT(s). Hence, this technique has another problem that a large number of integral molding dies are necessary when the bushings are produced in large volume.

The invention was devised so as to solve the problems in the related art as discussed above and has an object to provide an inexpensive, easy-to-manufacture current transformer support device having a simple configuration while fully furnished with necessary functions and integrally insulating and supporting conductors for three phases and current transformers, and a switchgear using the current transformer support device. Herein, the term, "current transformer", means a highest conception including a CT and a ZCT unless specified otherwise.

Solution to Problem

A current transformer support device of the invention includes three conductors, each of which has a first connection portion at one end and a second connection portion at the other end, and which are aligned side by side while being spaced apart from one another, and a current transformer case which integrally insulates and supports the three conductors between the one end and the other end. The current transformer support device is characterized in that the current transformer case has current transformer attachment portions provided at positions corresponding to at least two of the three conductors, to which ring-like current transformer coils formed so as to insert the conductors are attached, and that the current transformer case and the current transformer coils attached to the current transformer attachment portions are formed into one unit with a hardening insulating material.

A switchgear of the invention is characterized by including a casing, a storage portion in which drawable electrical equipment is stored in an interior of the casing, and the current transformer support device described above which is disposed behind the storage portion so as to oppose a connection terminal provided to a back surface of the electrical equipment and makes and breaks contact with the connection terminal in association with a movement of the electrical equipment when pushed in and pulled out.

Effects of Invention

According to the current transformer support device of the invention, the current transformer coils are attached to the current transformer case which is the support member insulating and supporting the conductors, and the current transformer case and the current transformer coils are formed into one unit with a hardening insulating material. Hence, the current transformer support device has a simple configuration and is easy to manufacture. Moreover, the current transformer support device can be readily adapted to a case where a zero-phase current transformer is installed or a bushing is additionally provided. Consequently, there can be obtained an effect that the current transformer support device can be provided at a low cost.

Also, according to the current transformer support device of the invention, the bushing can be attached to the bushing attachment portion in a re-attachable manner. Hence, the current transformer support device can be readily adapted to switchgears with different protection degrees by merely attaching or removing the bushing alone without having to change the current transformer support device. Also, even when the switchgear is of a type (CW type) with low protection degree having no shielding member, a protection effect as good as the protection effect achieved by a switchgear provided with the shielding member can be achieved because one compartment can be spaced and shielded from an adjacent compartment by attaching the bushing.

Further, according to the switchgear of the invention, the current transformers are integrally installed to the current transformer support device. Hence, the device becomes easy to assemble. Moreover, the switchgear can be readily adapted in various manners when a zero-phase current transformer is installed or a bushing is additionally provided. Consequently, there can be achieved an effect that the switchgear can be provided at a low cost.

BRIEF DESCRIPTION OF DRAWINGS

FIGS. 1A and 1B are views schematically showing a current transformer support device according to a first embodiment of the invention and a switchgear using the current transformer support device.

DESCRIPTION OF EMBODIMENTS

First Embodiment

Figure 2A:
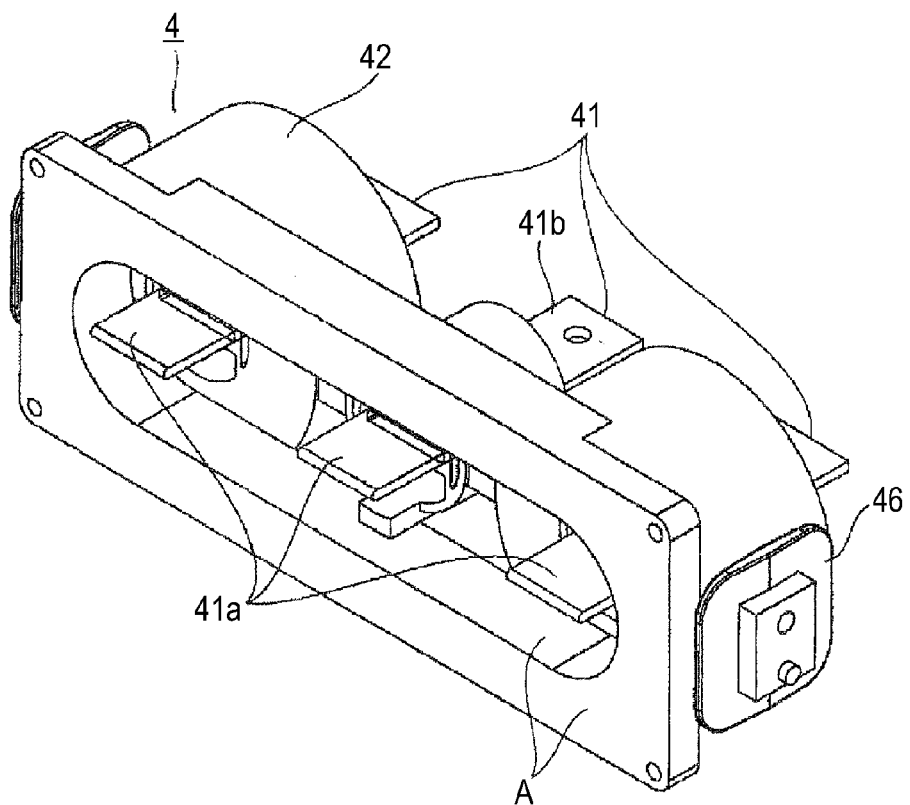
FIGS. 2A and 2B are views used to describe a combined CT-integrated three-phase insulating support, which is the current transformer support device shown in FIGS. 1A and 1B, FIG. 2A being a perspective view and FIG. 2B being a view used to describe that the combined CT-integrated three-phase insulating support is formed by potting.
Figure 2B:
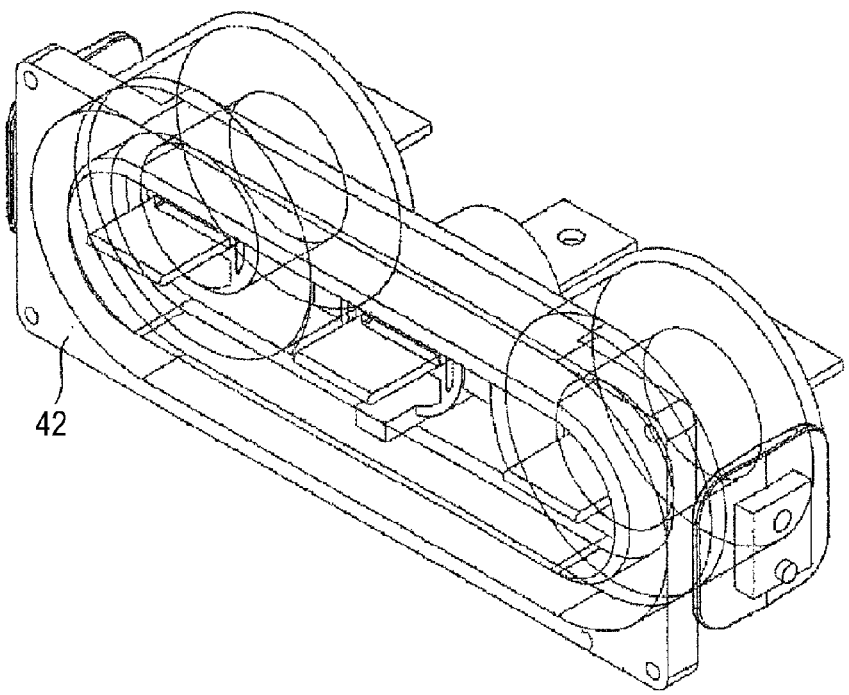
Figure 3:
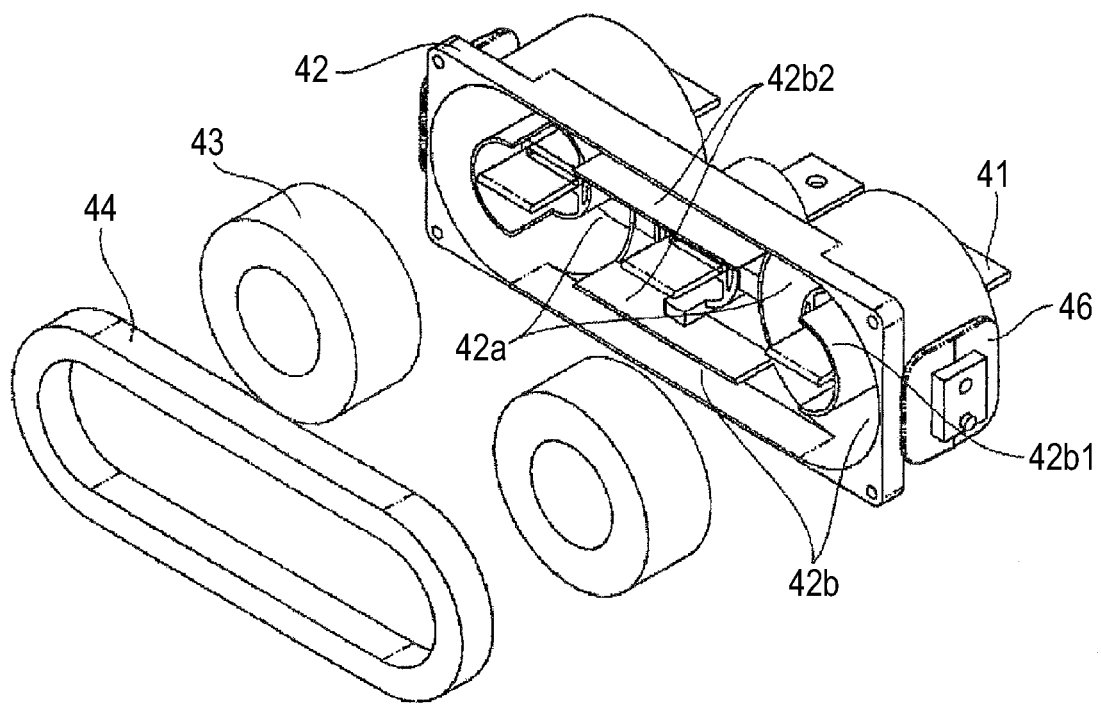
FIG. 3 is a perspective view of a support member, current transformer coils, and a zero-phase current transformer coil before the combined CT-integrated three-phase insulating support shown in FIGS. 2A and 2B is assembled.

FIGS. 1A and 1B are schematic views of a current transformer support device according to a first embodiment of the invention and a switchgear using the current transformer support device to show a configuration of a type with low protection degree (CW type) in which no shielding member is used. FIG. 1A is a front view of the switchgear and FIG. 1B is a sectional side view showing a major configuration of the switchgear. FIGS. 2A and 2B are views used to describe a combined CT-integrated three-phase insulating support, which is the current transformer support device shown in FIGS. 1A and 1B. FIG. 2A is a perspective view and FIG. 2B is a view used to describe that the combined CT-integrated three-phase insulating support is formed by potting. FIG. 3 is a perspective view of a current transformer case which is a support member, current transformer coils, and a zero-phase current transformer coil before the combined CT-integrated three-phase insulating support shown in FIGS. 2A and 2B is assembled.

Figure 4:
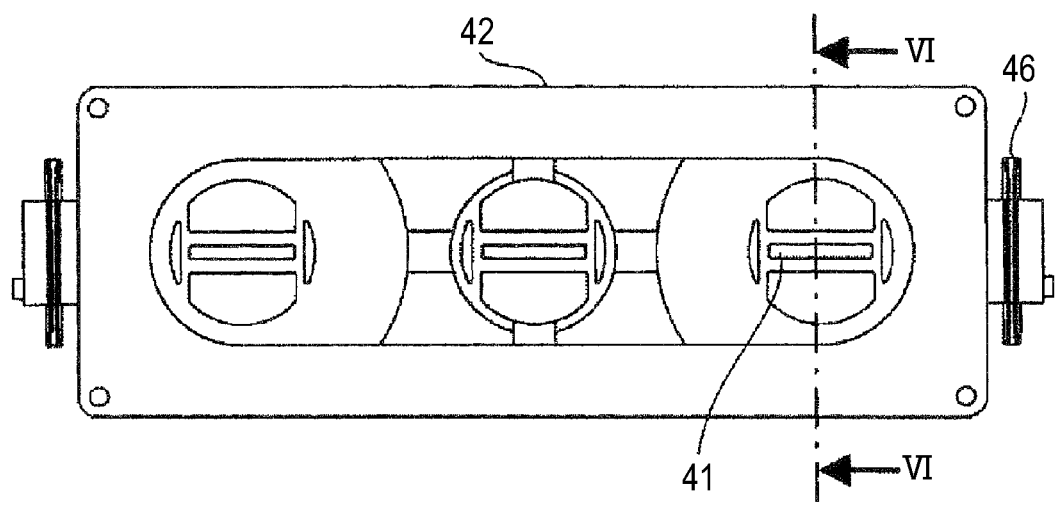
FIG. 4 is a front view of the combined CT-integrated three-phase insulating support shown in FIGS. 2A and 2B.
Figure 5:
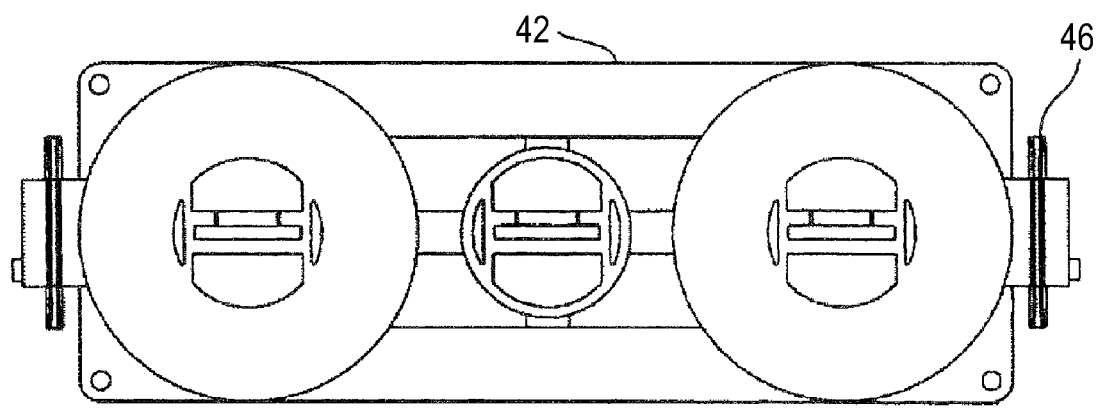
FIG. 5 is a rear view of the combined CT-integrated three-phase insulating support shown in FIGS. 2A and 2B.
Figure 6:
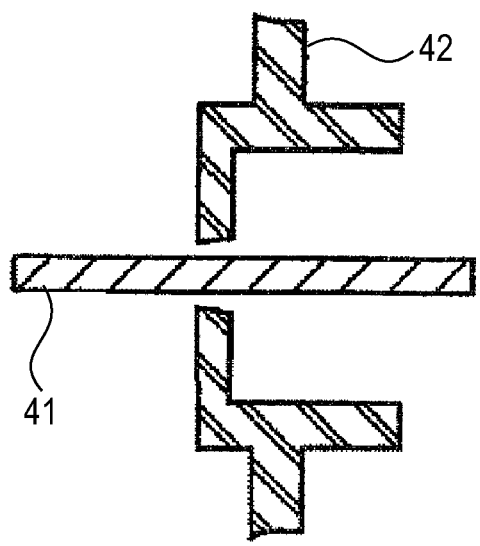
FIG. 6 is a sectional view taken along the line VI-VI of FIG. 4.
Figure 7:
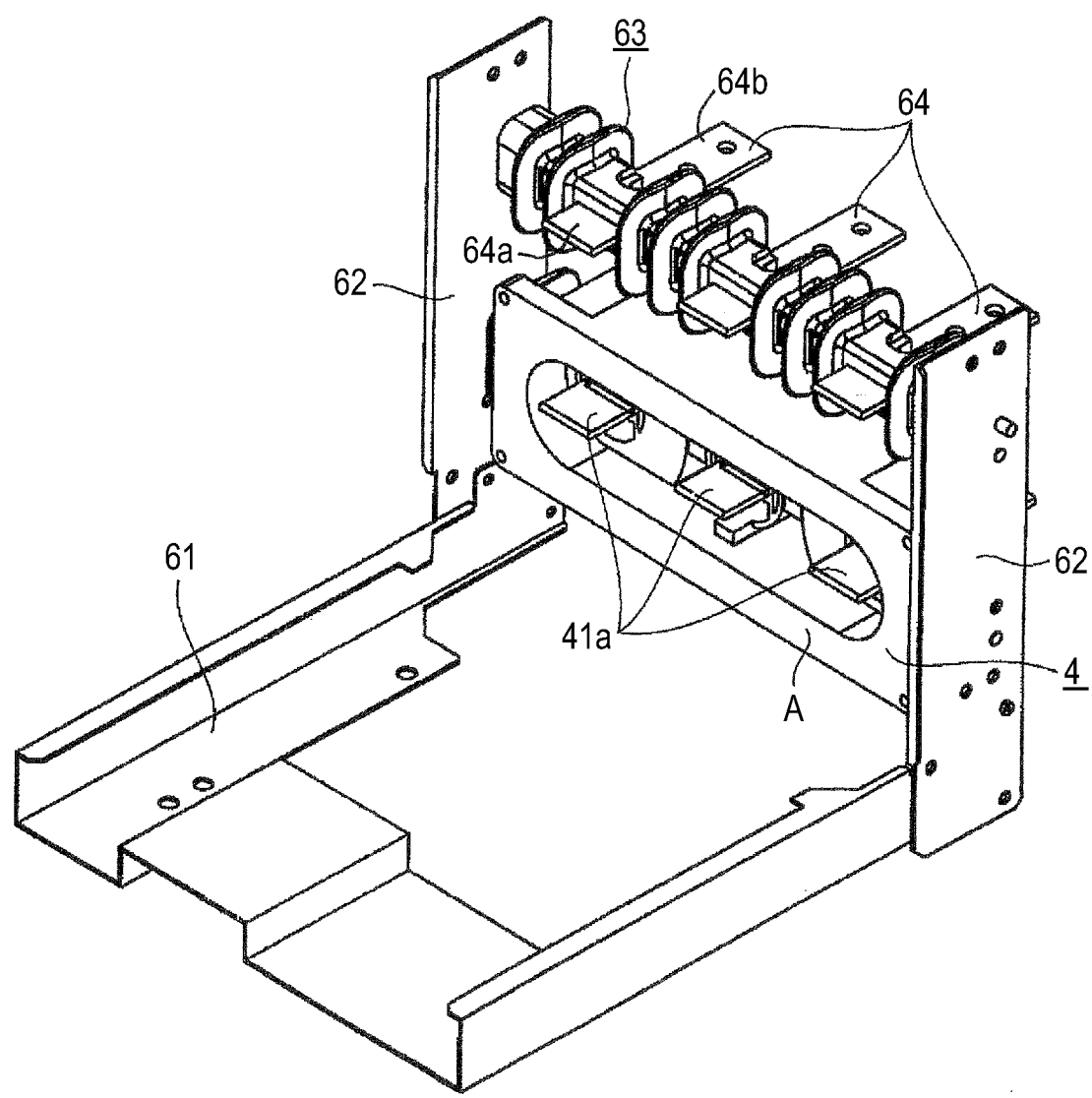
FIG. 7 is a perspective view showing a major configuration of a breaker chamber using the combined CT-integrated three-phase insulating support shown in FIGS. 2A and 2B.

FIG. 4 is a front view and FIG. 5 is a rear view of the combined CT-integrated three-phase insulating support shown in FIGS. 2A and 2B. FIG. 6 is a sectional view taken along the line VI-VI of FIG. 4. FIG. 7 is a perspective view showing a major configuration of a breaker chamber using the combined CT-integrated three-phase insulating support shown in FIGS. 2A and 2B. Referring to the drawings, a switchgear includes a metal enclosed casing 1, a breaker chamber 3 as a storage portion in which a breaker 2, which is drawable electrical equipment, is stored in such a manner that the breaker 2 can be pushed in and pulled out from an interior of the casing 1, and a combined CT-integrated three-phase insulating support 4 as a current transformer support device, which is disposed behind (on the right side of FIG. 1B) the breaker chamber 3 so as to oppose connection terminals 2a provided to a back surface portion of the breaker 2 and has conductors 41 (shown in FIG. 2) provided so as to make and break contact with the connection terminals 2a in association with a movement of the breaker 2 when pushed in or pulled out.

FIG. 1B shows a case where the breaker chambers 3 provided in the interior of the casing 1 are laminated vertically in two steps and a total of two breakers 2 are installed. The connection terminals 2a of the breaker 2 are formed of three conductors for three phases. A vertically separate pair of three conductors is provided so as to correspond to unillustrated movable electrode side and fixed electrode side of the breaker 2. The combined CT-integrated three-phase insulating support 4 is provided to a position corresponding to the upper connection terminal 2a of the breaker 2 in the upper step and also to a position corresponding to the lower connection terminal 2a of the breaker 2 in the lower step. Because the upper and lower combined CT-integrated three-phase insulating supports 4 are of the same configuration, a description will be given to the combined CT-integrated three-phase insulating support 4 corresponding to the lower connection terminal 2a.

As are shown in FIGS. 2A and 2B and FIG. 3, the combined CT-integrated three-phase insulating support 4 is provided with first connection portions 41a corresponding to the connection terminal 2a at one end (lower left in the drawings) and provided with second connection portions 41b electrically connected to a high-voltage cable 51 shown in FIG. 1B at the other end. The combined CT-integrated three-phase insulating support 4 includes three plate-like linear conductors 41 which are aligned side by side while being spaced apart from one another, and a current transformer case 42 which is a support member integrally insulating and supporting the three conductors 41 at an intermediate portion between the first connection portions 41a at one end and the second connection portions 41b at the other end.

The current transformer case 42 is molded from a hardening insulating material, for example, a glass base material or polyester resin, and includes current transformer attachment portions 42a provided at two points corresponding to two conductors 41 on both sides, to which are attached ring-like current transformer coils 43 each formed so as to insert the conductor 41 for one phase as a primary conductor. Further, when a need arises, the current transformer case 42 is provided with a zero-phase current transformer attachment portion 42b to which is attached an oval ring-like zero-phase current transformer coil 44 formed so as to insert the three conductors 41 collectively. The current transformer case 42 and the current transformer coils 43 attached to the current transformer attachment portions are formed into one unit by a hardening insulating material. As is shown in FIG. 3, the zero-phase current transformer attachment portion 42b is provided with arc-like wall surface portions 42b1 supporting apart of an inner peripheral surface of the zero-phase current transformer coil 44 and wall surface portions 42b2 supporting a part of linear portions. Folds 46 which secure a creeping distance to grounding metal (fixed frames 62 of FIG. 7) are provided to both side surfaces.

The combined CT-integrated three-phase insulating support 4 shown in FIG. 2A is a completed product manufactured as follows. That is, the current transformer coils 43 are inserted into the respective current transformer attachment portions 42a provided at two points of the current transformer case 42 which is a support member furnished with functions of supporting the conductors 41 forming a circuit shown in FIG. 3 and insulating the conductors 41 and having strength high enough to withstand an electromagnetic repulsion force in the event of a short circuit. Subsequently, the zero-phase current transformer coil 44 is inserted into the zero-phase current transformer attachment portion 42b followed by connection processing of terminal portions of unillustrated CT secondary winding and ZCT secondary winding. Finally, a liquid of hardening insulating material is poured into a predetermined void portion (potting) in the support member 42. FIG. 2B is a simulative view of members forming the completed product of FIG. 2A in perspective. The hardening insulating material used for potting is not particularly limited and can be selected appropriately from various materials commercially available from material manufacturers, a good example of which is liquid resin.

The current transformer coils 43 of a predetermined number of types, including those having different current transformation ratios (CT ratios) or those adaptable to a CT primary current in a broad range (for example, 50 A to 3000 A), may be prepared so that the one that best suits specifications, demands, and so on can be selected. Each of the current transformer coils 43 and the zero-phase transformer coil 44 is prepared in the form of one unit by winding a coil around an iron core of a predetermined shape (details are not shown in the drawings). A bushing attachment portion A, which is formed of a front end face of the combined CT-integrated three-phase insulating support 4 and a recess in the shape of a long hole made in a center portion of the front end face as shown in FIG. 2A, will be described in detail in a second embodiment below.

As is shown in FIG. 7, a pair of vertically extending fixed frames 62 is provided integrally with guide rails 61 of the breaker 2, and the combined CT-integrated three-phase insulating support 4 is fixed to the fixed frames 62 at a center in a vertical direction with bolts (not shown) or the like. A known three-phase insulating support 63 having neither a CT nor a ZCT is provided to the fixed frames 62 on an upper side of the combined CT-integrated three-phase insulating support 4. In the case of the breaker chamber 3 in the upper step of the switchgear, as is shown in FIG. 1B, the combined CT-integrated three-phase insulating support 4 is provided inversely to the manner described above, that is, on the upper side, and the three-phase insulating support 63 is provided in a center portion in the vertical direction.

In either case, the second connection portions 41b of the conductors 41 of the combined CT-integrated three-phase insulating support 4 are electrically connected to the high-voltage cable 51. The three-phase insulating support 63 is formed using three plate-like conductors 64 which are insulated, supported, and aligned side by side while being spaced apart from one another. Each conductor 64 has a first connection portion 64a making and breaking contact with the connection terminal 2a at one end (left portion of FIG. 7) and a second connection portion 64b electrically connected to a branch bus 53 (shown in FIG. 1B) branched from a common bus 52 (shown in FIG. 1B) at the other end. The first connection portions 41a of the conductors 41 of the combined CT-integrated three-phase insulating support 4 and the first connection portions 64a of the conductors 64 of the three-phase insulating support 63 are connected so as to fit to the corresponding connection terminals 2a provided to the back surface of the breaker 2 when the breaker 2 is inserted into the breaker chamber 3 and pushed to an innermost connection position in the breaker chamber 3.

As has been described, the combined CT-integrated three-phase insulating support 4 which is the current transformer support device of the first embodiment is manufactured by attaching the current transformer coils 43 to the respective two current transformer attachment portions 42a provided to the current transformer case 42 which is the support member first and then attaching the zero-phase current transformer coil 44 to the zero-phase current transformer attachment portion 42b. Accordingly, the zero-phase current transformer (ZCT) and the current transformers (CTs) are sequentially disposed always from a power supply side to a load side. Hence, in the event of a ground fault, the ZCT detects a ground-fault current flowing from the power supply side to the load side at a position closer to the power supply side. Consequently, a region on the load side of the ZCT increases as a distance to the power supply side becomes shorter and a region that the ZCT can protect is increased.

The conductors 41 of the combined CT-integrated three-phase insulating support 4 may be formed integrally with the CTs and the ZCT when the combined CT-integrated three-phase insulating support 4 is manufactured as described above. Alternatively, it may be configured in such a manner that after the current transformer coils 43 and the zero-phase current transformer coil 44 are attached to the current transformer case 42 which is the support member and all are formed into one unit with a hardening insulating material, the three conductors 41 are inserted into the current transformer coils 43 and the zero-phase current transformer coil 44, which are now an integral part of the support member 42, and attached to the current transformer case 42 with bolts (not shown) or the like. Further, instead of the manufacturing method using the potting as described above, the respective component members may be manufactured by integral molding.

As has been described, according to the current transformer support device formed of the combined CT-integrated three-phase insulating support 4 of the first embodiment, the current transformer coils 43 are attached to the current transformer case which is the support member 42 insulating and supporting the conductors 41, and the current transformer coils 43 and the support member 42 are formed into one unit with a hardening insulating material. Hence, the current transformer support device is readily formed in a small size while ensuring electrical insulation and mechanical strength. Moreover, the current transformer support device has a simple configuration and is therefore easy to manufacture. Further, the current transformer support device can be readily adapted to a case where a zero-phase current transformer coil is installed or a bushing is additionally provided. Hence, there can be achieved an effect that the current transformer support device can be provided at a low cost. Also, in a case where the current transformer coils 43 adopt those capable of changing a CT primary current in a broad range (for example, 50 A to 3000 A), even when a CT ratio needs to be changed, the CT ratio can be changed without having to replace the CT.

According to the switchgear using the combined CT-integrated three-phase insulating support 4 of the first embodiment configured as above, installation of the CTs and the ZCT can be completed by merely attaching the combined CT-integrated three-phase insulating support 4 and the three-phase insulating support 63 same as the existing one to the fixed frames 62 of the breaker chamber 3 with bolts (not shown) as shown in FIG. 7. Hence, assemble workability of the switchgear can be improved and working hours can be shorter. Consequently, the switchgear can be provided at a low cost. In addition, it is easy to interchange the combined CT-integrated three-phase insulating support 4 fit to the upper terminal of the breaker 2 and the combined CT-integrated three-phase insulating support 4 fit to the lower terminal.

Second Embodiment

Figure 8:
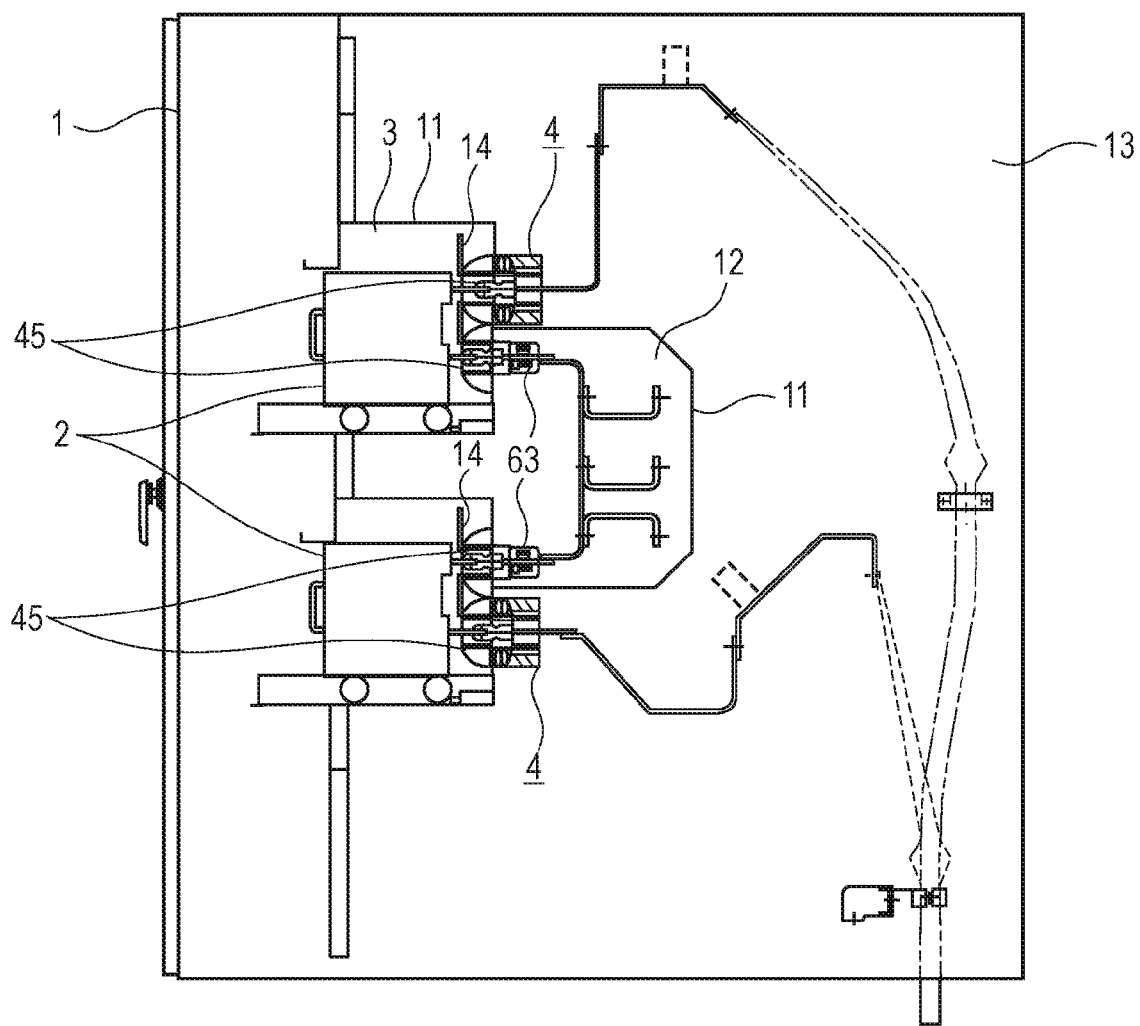
FIG. 8 is a sectional side view schematically showing a current transformer support device according to a second embodiment of the invention and a switchgear using the current transformer support device.
Figure 9A:
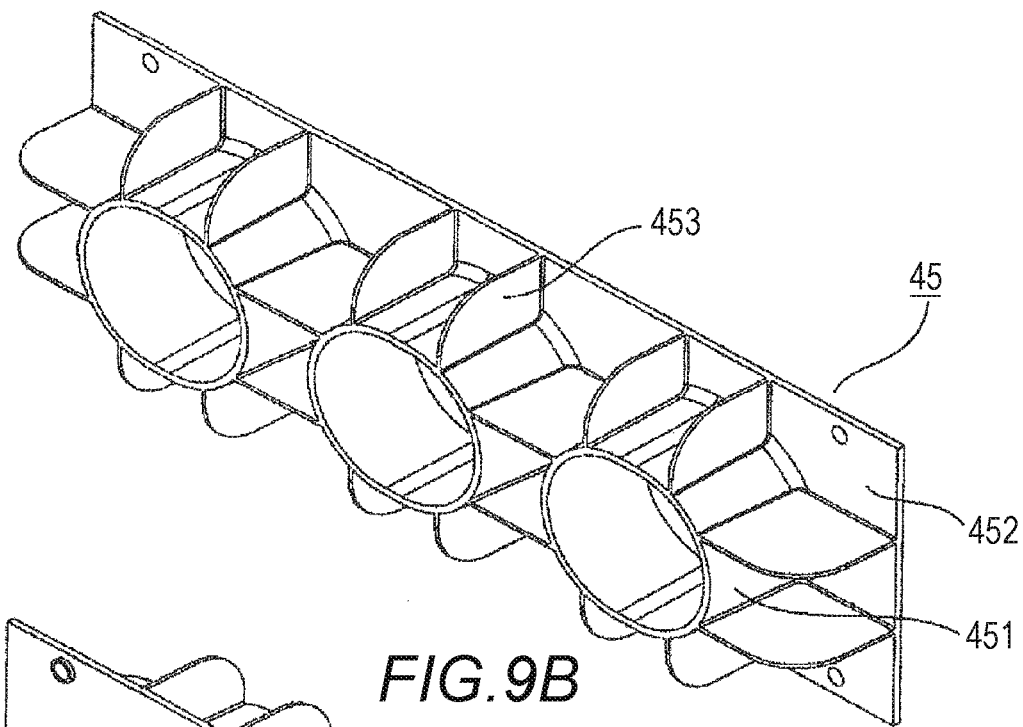
FIGS. 9A and 9B are perspective views of a bushing shown in FIG. 8.
Figure 9B:
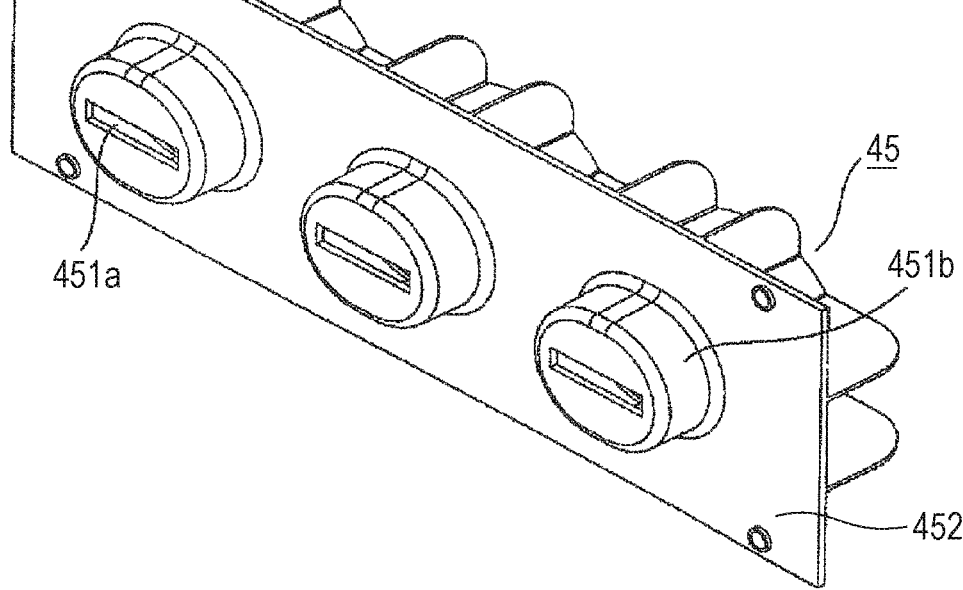
Figure 10A:
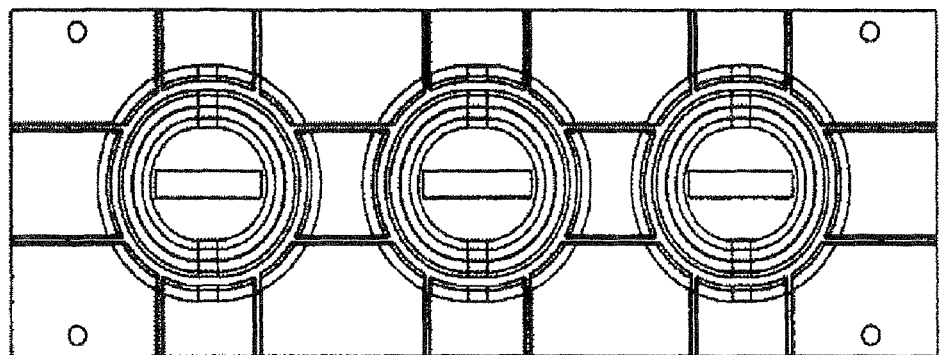
FIGS. 10A and 10B are views of the bushing shown in FIG. 8, FIG. 10A being a front view and FIG. 10B being a rear view.
Figure 10B:
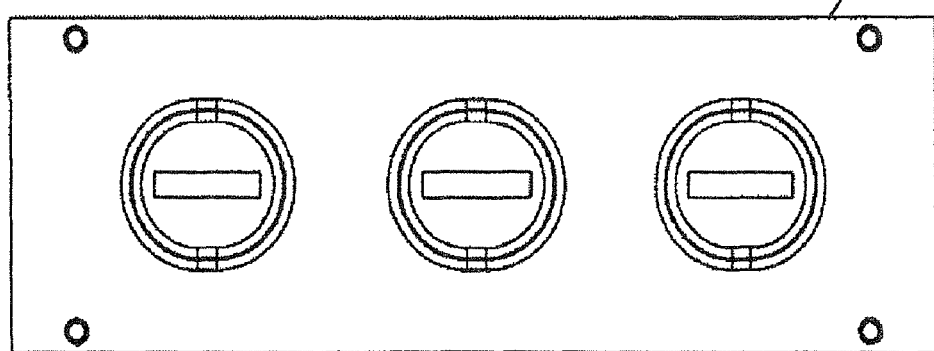

FIG. 8 is a schematic sectional side view of a current transformer support device according to a second embodiment of the invention and a switchgear using the current transformer support device to show a type with high protection degree (MW type and PW type) in which respective pieces of equipment are disposed in compartments physically divided by a shielding member. FIGS. 9A and 9B are perspective views of a bushing shown in FIG. 8. FIG. 9A is a perspective view when viewed from a front surface side and FIG. 9B is a perspective view when viewed from a back surface side. FIGS. 10A and 10B are views of the bushing shown in FIG. 8. FIG. 10A is a front view and FIG. 10B is a rear view.

Figure 11:
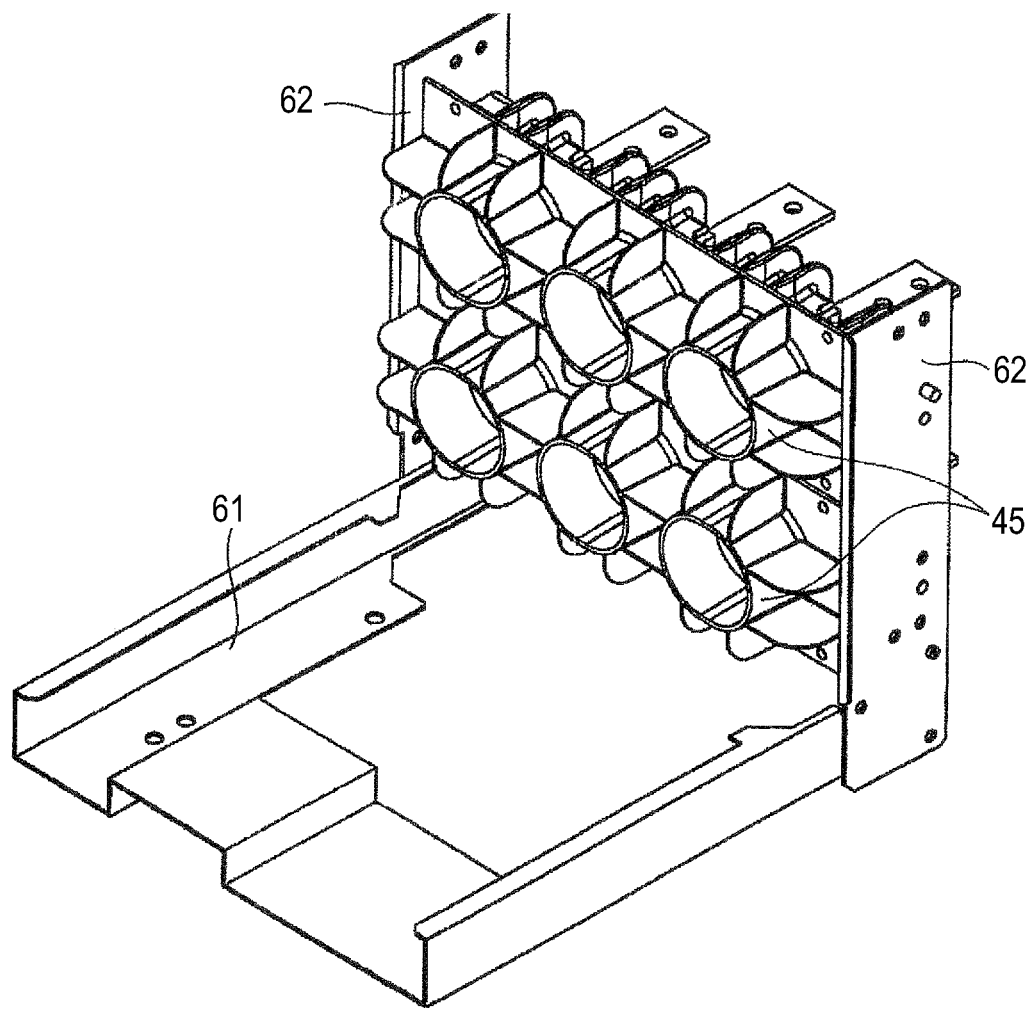
FIG. 11 is a perspective view showing a major configuration of a breaker chamber when the bushings shown in FIGS. 9A and 9B are used in a combined CT-integrated three-phase insulating support.

FIG. 11 is a perspective view showing a major configuration of a breaker chamber when the bushings as shown in FIGS. 9A and 9B are used for a combined CT-integrated three-phase insulating support. The second embodiment is applicable to a case where the breaker chamber is divided from the other compartments by providing a shielding member, such as a partition wall, in between. Referring to FIG. 8, a breaker chamber 3 as a storage portion is divided from other compartments by a shielding member 11, and a main bus chamber 12 and a cable chamber 13 are defined. As with the first embodiment above, bushings 45 as shown in FIGS. 9A and 9B, which are made, for example, of an insulting resin material, are attached in front of a combined CT-integrated three-phase insulating support 4 and a three-phase insulating support 63. A shutter 14 is provided to a front surface of the bushing 45 so as to shield conductors 41 when a breaker 2 is pulled outside.

As are shown in FIGS. 9A and 9B, the bushing 45 is provided with three conductor surrounding portions 451 shaped like a bottomed-cylinder opening to the front surface side and formed so as to surround three conductors 41 (shown in FIG. 2A) in a one-to-one correspondence. A slit-like through-hole 451a is provided to a bottom surface of each conductor surrounding portion 451 so as to insert the plate-like linear conductor 41 when the bushing 45 is attached to a bushing attachment portion A shown in FIG. 2A. Also, pleats 453 are provided on the periphery of the respective conductor surrounding portions 451 so as to increase strength and prevent hooking of the shutter 14. The through-holes 451a may be of a size to provide a clearance between an outer peripheral surface of the conductor 41 and an inner peripheral surface of the through-hole 451a. A plate-like partition wall portion 452 is provided so as to divide each conductor 41 to a side of one end and a side of the other end. The conductor surrounding portion 451 is provided so as to penetrate halfway through the partition wall portion 452. The bushing 45 is attached by letting each protrusion portion 451b including the bottom surface come inside a recess in the shape of a long hole made in the bushing attachment portion A shown in FIG. 2A. The bushings 45 are also provided on the side of the three-phase insulating support 63, and as is shown in FIG. 11, the bushings are attached to fixed frames 62. The rest of the configuration is the same as the configuration of the first embodiment above.

According to the second embodiment configured as above, the combined CT-integrated three-phase insulating support 4 is provided with the bushing attachment portion A to which the bushing 45 is attached in a re-attachable manner. Hence, the second embodiment is adaptable to both specifications with and without the shielding member in the interior of the switchgear. Consequently, the number of types of the forming members can be reduced. In addition, the combined CT-integrated three-phase insulating support 4 is easy to assemble and disassemble. In a case where the through-holes 451a provided to the bushings 45 for the corresponding conductors 41 to penetrate through are of a size large enough to provide a clearance between the conductors 41 and the through-holes 451a, the bushings 45 and the conductors 41 are not indirect contact with each other when the bushings 45 are attached as shown in FIG. 11. Hence, there can be obtained an effect that folds (denoted by 46 in FIG. 2A) used to extend a creeping distance provided for an "insulating" function of the bushing can be omitted. More specifically, insulation breakdown from the conductors 41 to the ground portion readily occurs when the bushings 45 are contaminated. In order to prevent such an inconvenience, the bushing in the related art is provided with the folds (denoted by 46 in FIG. 2A) to secure a long distance from a charge portion to the ground. This distance, however, can be shorter by providing a spatial gap between the bushing 45 and the conductor 41. Hence, the folds or the like can be omitted for the reason as above.

Third Embodiment

Figure 12:
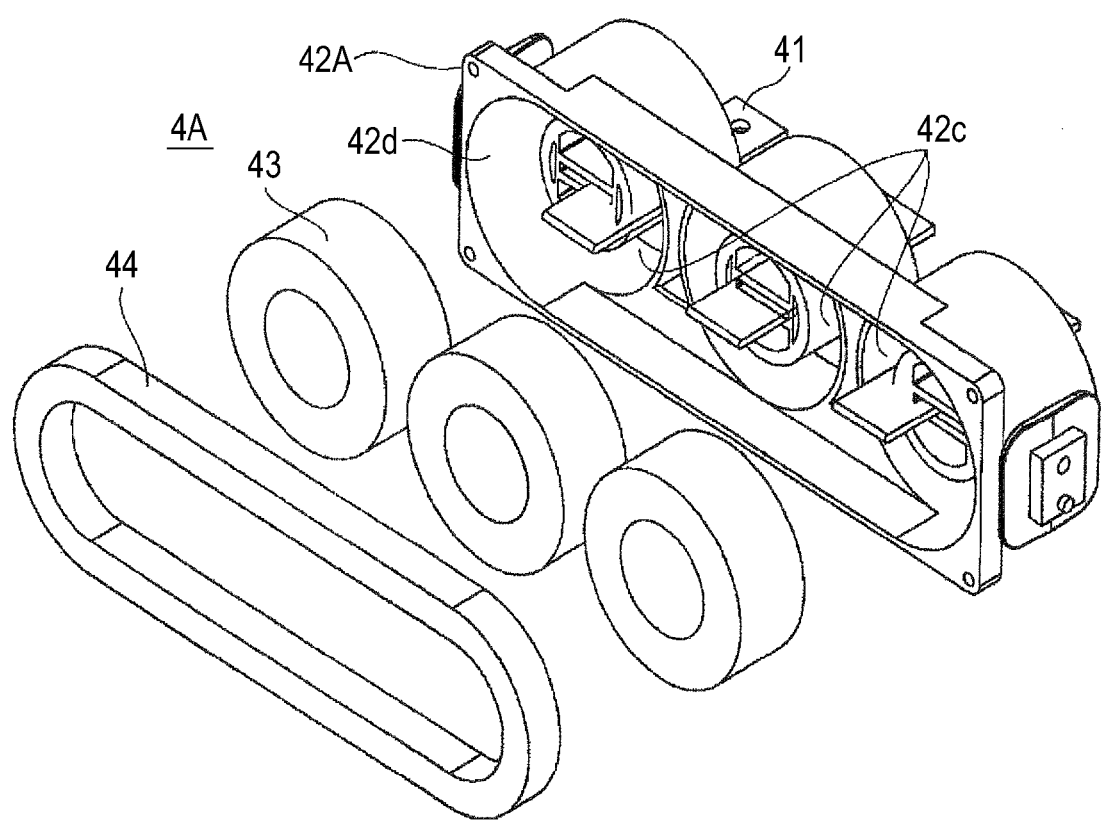
FIG. 12 is a perspective view of a support member, current transformer coils, and a zero-phase current transformer coil before a combined CT-integrated three-phase insulating support, which is a current transformer support device according to a third embodiment of the invention, is assembled.
Figure 13:
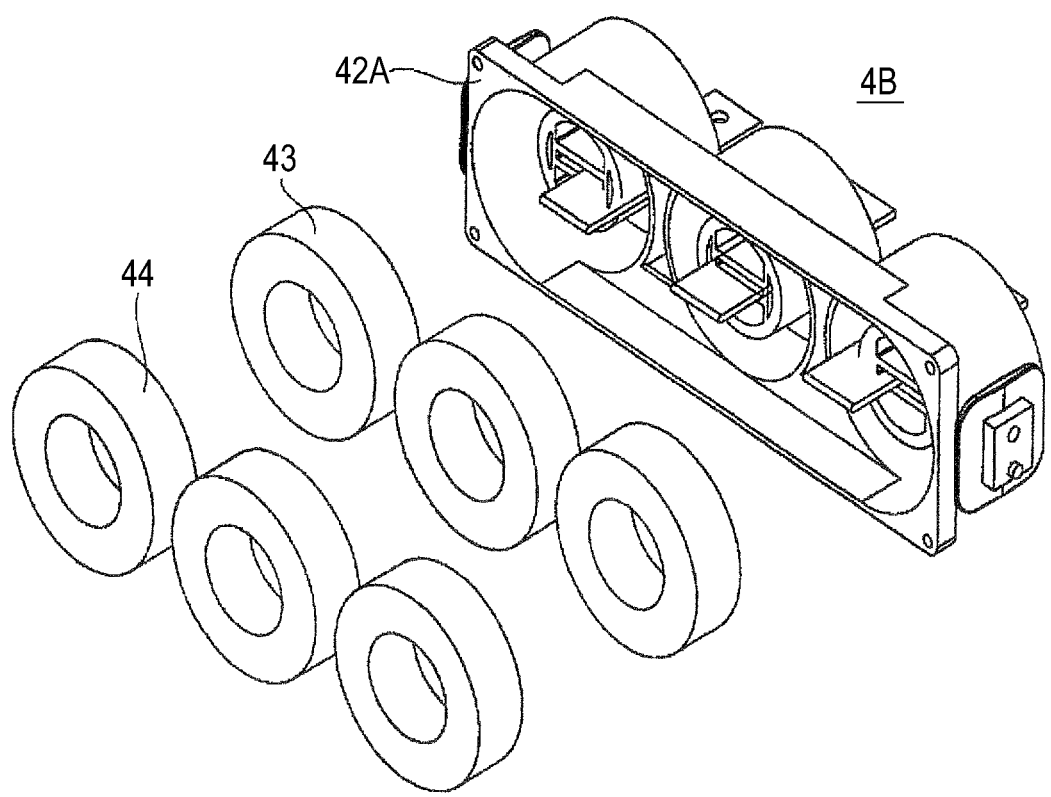
FIG. 13 is a perspective view of a modification of the combined CT-integrated three-phase insulating support shown in FIG. 12.
Figure 14:
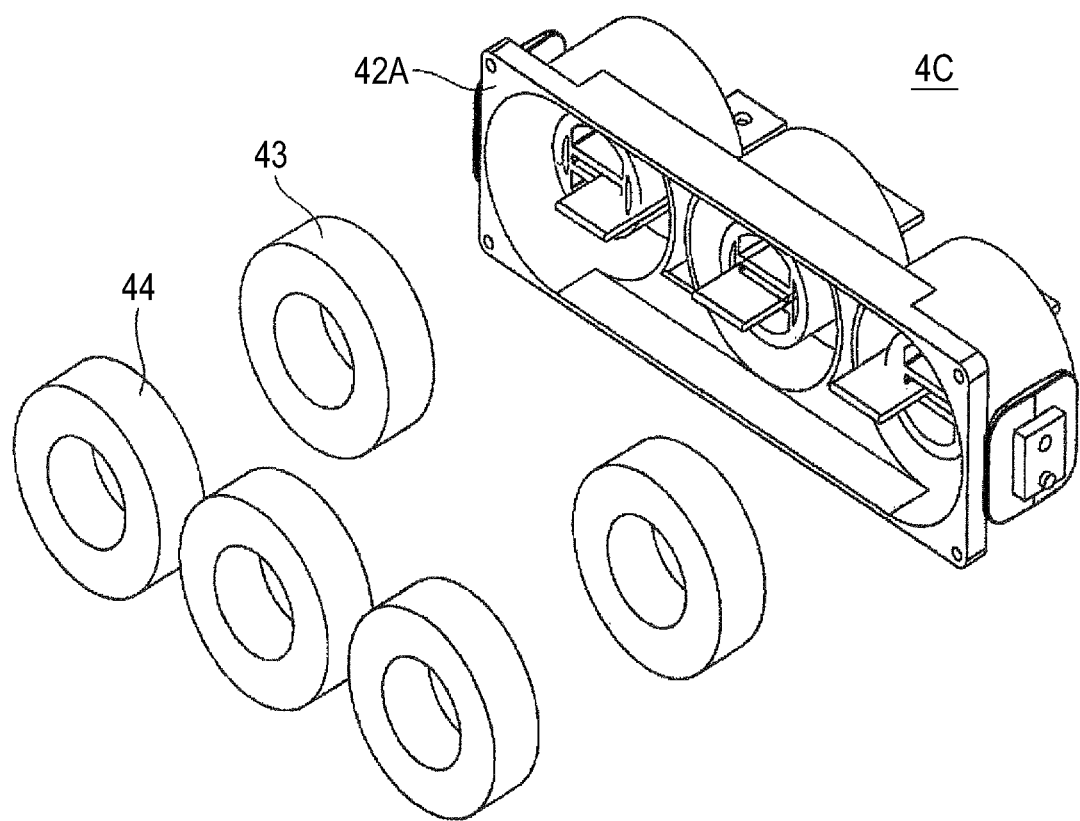
FIG. 14 is a perspective view of another modification of the combined CT-integrated three-phase insulating support shown in FIG. 12.

FIG. 12 is a perspective view of a current transformer case to serve as a support member, current transformer coils, and a zero-phase current transformer coil before a combined CT-integrated three-phase insulating support, which is a current transformer support device according to a third embodiment of the invention, is assembled. FIG. 13 is a perspective view showing a modification of the combined CT-integrated three-phase insulating support shown in FIG. 12. FIG. 14 is a perspective view showing another modification of the combined CT-integrated three-phase insulating support shown in FIG. 12. In the third embodiment, the current transformer case 42 shown in FIG. 3 of the first embodiment above is changed to a current transformer case 42A shown in FIG. 12 through FIG. 14, and various combinations are made available for current transformer coils 43 and zero-phase current transformer coils 44 same as the counterparts in the first embodiment above, so that the combinations can be changed as needed. Examples of the combinations of CTs and ZCT(s) include but not limited to 3×CT+ZCT (FIG. 12), 3×CT+3×CT (FIG. 13), and 2×CT+3×CT (FIG. 14).

Referring to FIG. 12, the current transformer case 42A, which is a support member in the combined CT-integrated three-phase insulating support 4A, includes three current transformer attachment portions 42c aligned side by side so as to correspond to respective conductors 41 for three phases aligned side by side. Unlike the zero-phase current transformer attachment portion 42b shown in FIG. 3 which is of a shape provided with the arc-like wall surface portions 42b1 to support a part of the inner peripheral surface of the zero-phase current transformer coil 44 and the wall surface portions 42b2 to support a part of the linear portions, a zero-phase current transformer attachment portion 42d supports only the outer peripheral surface of the zero-phase current transformer coil 44 and therefore a wall surface to support the inner peripheral surface is omitted. The zero-phase current transformer attachment portion 42d in the state as described above is formed using a space left after three or two current transformers 43 are attached to the current transformer attachment portions 42c. The rest of the configuration is the same as the configuration of the first embodiment above.

In the third embodiment configured as shown in FIG. 12, the current transformer case 42A is provided with the current transformer attachment portions 42c which correspond to the respective conductors 41 for three phases. Hence, the current transformer coils 43 can be attached to the respective three conductors 41 and further the zero-phase current transformer coil 44 can be attached to the zero-phase current transformer attachment portion 42d. In addition, as a modification shown in FIG. 13, a combined CT-integrated three-phase insulating support 4B having a combination of 3×CT+3×CT can be formed using the same support member 42A. Alternatively, as another modification shown in FIG. 14, a combined CT-integrated three-phase insulating support 4C having a combination of 2×CT+3×CT can be formed. Although it is not shown in the drawings, three sets, namely, 3×CT alone, 2×CT alone, and 3×CT, may be combined. Further, the CTs may be a CT capable of changing a primary side in a broad range.

According to the third embodiment as above, the support member 42A used herein is provided with the three current transformer attachment portions 42c aligned side by side so as to correspond to the respective conductors 41 for three phases aligned side by side. Hence, in addition to the effects of the first and second embodiments above, multiple current transformer coils 43 can be combined in various manners. Consequently, there can be obtained an effect that the current transformer support device is simple and easy to assemble while satisfying a variety of requests.

It should be appreciated that the respective embodiments of the invention described above can be combined either partially or entirely without any restriction or the respective embodiments can be modified or omitted as needed within the scope of the invention.

DESCRIPTION OF SIGNS

1: casing, 11: shielding member, 12: main bus chamber, 13: cable chamber, 14: shutter, 2: breaker, 2a: connection terminal, 3: breaker chamber (storage portion), 4, 4A, 4B, and 4C: combined CT-integrated three-phase insulating support, 41: conductor, 41a: first connection portion, 41b: second connection portion, 42 and 42A: support member (current transformer case), 42a: current transformer attachment portion, 42b: zero-phase current transformer attachment portion, 42b1: arc-like wall surface portion, 42b2: wall surface portion, 42c: current transformer attachment portion, 42d: zero-phase current transformer attachment portion, 43: current transformer coil, 44: zero-phase current transformer coil, 45: bushing, 451: conductor surrounding portion, 451a: through-hole, 451b: protrusion portion, 452: partition wall portion, 453: pleat, 46: fold, 51: high-voltage cable, 52: common bus, 53: branch bus, 61: guide rail, 62: fixed frame, 63: three-phase insulating support, 64: conductor, A: bushing attachment portion

The invention claimed is:

1. A current transformer support device, comprising:
three device conductors, each of which has a first connection portion at one end and a second connection portion at another end, and which are aligned linearly side by side while being spaced apart from one another;
a current transformer case which integrally insulates and supports the three device conductors between the one end and the other end,
wherein the current transformer case includes:
a bushing attachment portion having a recess in a shape of an elongated hole is provided at a front end face of the current transformer case;
a zero-phase current transformer attachment portion extending rearwardly from the front end face; and
a plurality of current transformer attachment portions provided at positions corresponding to at least two of the three device conductors, the current transformer attachment portions disposed farther from the front end face than the zero-phase current transformer attachment portion, wherein each of the plurality of current transformer attachment portions is contiguous with the zero-phase current transformer attachment;
a bushing in which the device conductors are inserted and which insulates and supports the device conductors is attached to the bushing attachment portion in a re-attachable manner;
the bushing includes conductor surrounding portions to surround the three device conductors in a one-to-one correspondence, and a through-hole provided to a bottom portion of each of the conductor surrounding portions so as to insert a corresponding one of the device conductors when the bushing is attached to the bushing attachment portion; and a clearance is provided between an outer peripheral surface of each of the device conductors and an inner peripheral surface of a corresponding one of the through-hole provided to the bushing.

2. The current transformer support device according to claim 1, wherein:

the current transformer case further includes a plurality of ring-shaped current transformer being inserted into current transformer attachment portions to surround the device conductors; and the current transformer case and the ring-shaped current transformer coil are formed into one unit with a hardening insulating material.

3. The current transformer support device according to claim 2, wherein:

the current transformer case further includes an oval ring-shaped zero-phase current transformer coil being inserted into the zero-phase current transformer attachment portion to collectively surround the three device conductors; and the oval ring-shaped zero-phase current transformer coil and the current transformer case are formed into one unit with the hardening insulating material.

4. The current transformer support device according to claim 1, further comprising a plurality of pleats provided on a periphery of the conductor surrounding portions.

5. The current transformer support device according to claim 1, wherein:

the current transformer attachment portions of the current transformer case being aligned side by side so as to correspond to respective ones of the device conductors, the device conductors for three electric phases.

6. A switchgear, comprising:

a casing;

a storage portion in which drawable electrical equipment is stored in an interior of the casing; and the current transformer support device set forth in claim 1, which is disposed behind the storage portion so as to oppose a connection terminal provided to a back surface of the electrical equipment and has the conductor making and breaking contact with the connection terminal in association with a movement of the electrical equipment when pushed in and pulled out of the storage portion.

7. The switchgear according to claim 6, wherein:

the storage portion includes a plurality of storage portions provided in the interior of the casing in vertical multiple steps; and the electrical equipment in each of the storage portions has a connection terminal formed of three equipment conductors, the three equipment conductors for three electric phases.

8. The switchgear according to claim 7, wherein:

a pair of the three equipment conductors for the three phases is provided on the back surface of the electrical equipment, the pair separated on upper and lower sides of the electrical equipment;

a first one of the current transformer support device is provided at a position corresponding to the three equipment conductors on the upper side of the electrical equipment in an upper step of the vertical multiple steps; and a second one of the current transformer support device is provided at a position corresponding to the three equipment conductors on the lower side of the electrical equipment in a lower step of the vertical multiple steps.

* * * * *